United States Patent [19]
Priest et al.

[11] Patent Number: 5,293,626
[45] Date of Patent: Mar. 8, 1994

[54] CLOCK DISTRIBUTION APPARATUS AND PROCESSES PARTICULARLY USEFUL IN MULTIPROCESSOR SYSTEMS

[75] Inventors: Edward C. Priest; Steven C. Barber, both of Eau Claire; Ken Shintaku; David A. Hanson, both of Altoona; Dan L. Massopust, Eau Claire, all of Wis.

[73] Assignee: Cray Research, Inc., Eagan, Minn.

[21] Appl. No.: 536,270

[22] Filed: Jun. 8, 1990

[51] Int. Cl.⁵ ............................................. G06F 13/00
[52] U.S. Cl. ..................................... 395/550; 371/1; 385/39; 385/90
[58] Field of Search ................. 364/271, 271.5, 271.2, 364/950, 950.3, 950.4; 371/1; 385/88, 90, 91, 39; 395/550

[56] References Cited

U.S. PATENT DOCUMENTS

| | | | |
|---|---|---|---|
| 3,753,241 | 8/1973 | Bayne | 364/900 |
| 4,118,100 | 12/1978 | Goell et al. | 385/84 |
| 4,294,512 | 10/1981 | Logan | 385/91 |
| 4,490,821 | 12/1984 | Lacher | 364/200 |
| 4,714,924 | 12/1987 | Ketzler | 371/1 |
| 4,756,590 | 7/1988 | Forrest et al. | 350/96.15 |
| 4,818,995 | 4/1989 | Takahashi et al. | 371/1 |
| 4,833,695 | 5/1989 | Greub | 371/1 |
| 4,851,995 | 7/1989 | Hsu et al. | 364/200 |
| 4,860,322 | 8/1989 | Lloyd | 371/1 |
| 4,881,165 | 11/1989 | Sager et al. | 364/200 |
| 4,900,115 | 2/1990 | Heuring et al. | 350/96.15 |
| 4,927,228 | 5/1990 | Van De Pas | 385/90 |
| 4,929,888 | 5/1990 | Yoshida | 371/1 |
| 4,949,249 | 8/1990 | Lefsky | 364/200 |
| 4,959,540 | 9/1990 | Fan et al. | 395/39 |
| 5,109,449 | 4/1992 | Newberg et al. | 250/227.11 |

OTHER PUBLICATIONS

D. H. Hartman, "Photonic systems Interconnections—Overcoming the High Speed Electronics Bottleneck", Hybrid Circuits, No. 16, pp. 12-18 (1988).

R. L. Khalil, L. R. McAdams and J. W. Goodman, "Optical clock distribution for high speed computors", SPIE vol. 991, Fiber Optic Datecom and Computer Networks (1988).

Primary Examiner—Eugene R. LaRoche
Assistant Examiner—Christopher R. Glembocki
Attorney, Agent, or Firm—Merchant, Gould, Smith, Edell, Welter & Schmidt

[57] ABSTRACT

Clock pulses from a master oscillator are distributed in a multiprocessor computer system so that they arrive at a large number of utilization points located in operating clusters of modules within extremely tight time tolerances of each other. The delays associated with each component, electrical or optical connection, cable or the like are determined by direct measurement or by using known standard characteristics. A time delay budget for each complete clock pulse path from the point of initial divergence from the master clock source to the final chip delivery point is logged and summed. Components capable of introducing predetermined amounts of time delay are incorporated in some or all clock pulse paths. These components are adjusted so as to balance out the differences determined from the clock path budgets. The clock paths are implemented in electrical components either alone or in combination with optical components, or in substantially all optical configurations. One arrangement for controlling optical skew includes an arrangement of optical elements physically displaceable in a coaxial direction relative to one another. Skew adjustment networks employ a unique composition of coarse and fine selectable delay arrays implemented either by electrical components, optical components, or a combination thereof.

13 Claims, 10 Drawing Sheets

CLOCK DISTRIBUTION APPARATUS AND PROCESSES PARTICULARLY USEFUL IN MULTIPROCESSOR SYSTEMS

CROSS REFERENCE TO RELATED APPLICATION

Some or all of the devices and processes described herein are potentially useable in the system described in the copending and commonly assigned U.S. patent application Ser. No. 07/459,083 filed Dec. 29, 1989 for CLUSTER ARCHITECTURE FOR A HIGHLY PARALLEL SCALAR/VECTOR MULTIPROCESSOR by Steve S. Chen, Frederick J. Simmons, George A. Spix, Jimmie R. Wilson, Edward C. Miller, Roger E. Eckert and Douglas R. Beard.

BACKGROUND OF THE INVENTION

The present invention relates to apparatus and processes useful in multiple processor computer systems. More particularly, the present invention is concerned with methods and apparatus for controlling and/or accommodating the time delay associated with passage of a signal in the form of an electrical and/or optical pulse through a discrete component. Still further, the present invention accepts master clock pulses from a source and distributes a multiplicity of replications of the master clock pulses so as to allow distribution of those pulses throughout a complex system in a carefully controlled manner. This invention relates to devices and methods which assist in ensuring that timing pulses originating from a master clock pulse source are distributed for controlling a variety of electronic data handling and/or computer functions so as to arrive at a plurality of distribution points within an extremely close time tolerance and with well preserved signal integrity as compared to the master clock pulses.

DESCRIPTION OF THE PRIOR ART

Coordination of clock pulse generation in multiple processor environments in the past has frequently relied upon synchronization of a multiplicity of independent master oscillators by adjusting the operation of the oscillators as such. However, these techniques are not acceptable for clustered scalar/vector multiprocessors and their associated memories and input/output (I/O) interfacing controllers.

Electrical delay lines for use in timing function controls have existed since the early development days of computers. These have evolved to contemporary devices which are selectively programmable to vary the amount of delay selected.

The use of optical connections as part of the clock distribution for synchronous systems is discussed in articles by R. L. Khalil, L. R. McAdams and J. W. Goodman, "Optical Clock Distribution for High Speed Computers", SPIE, Vol. 991, Fiber Optic Datacom and Computer Networks, pp. 32–41 (1988), and D. Hartman, "Photonic Systems Interconnections—Overcoming the High Speed Electronics Bottleneck", Hybrid Circuits, No. 16, pp. 12–18 (1988).

Devices and processes for selecting the amount of time skew encountered by light pulses passing through particular configurations of light paths are also known. Serially functioning optical logic circuits including optical delay line memories, optical splitters and optical pulse restoration in recirculation devices are disclosed in U.S. Pat. No. 4,900,115 by V. P. Heuring, H. F. Jordan and J. P. Pratt.

None of the known prior art devices and techniques are capable of controlling the distribution of hundreds or thousands of clock pulses produced from a single master clock oscillator operating in high mega-Hertz ranges so that all those clock pulses arrive at their utilization destinations within extremely tight time tolerances and with fully useable pulse quality and integrity.

SUMMARY OF THE INVENTION

The present invention is apparatus and methods for distributing clock pulses from a master clock pulse generator to a multiprocessor type of system. It is intended for such a system which has at least one module which must receive a multiplicity of such clock pulses at a multiplicity of clock pulse receiving points. The module controls operation of system components in response to arrival of the clock pulses at the receiving points and it is intended these pulses will arrive within a predetermined maximum time displacement relative to each other.

The apparatus includes a plurality of paths each connected to receive clock pulses from the master clock and having an output connection to a respective clock pulse receiving point of the module. Each path includes elements connected for transferring the clock pulses from the master clock to a respective module receiving point. At least one of the paths also includes an arrangement for adjusting the delay of the clock pulses passing through that path so that the passing clock pulse arrives at the destination output connection associated with that path with a time displacement equal to or less than the predetermined maximum time displacement.

The adjusting can take several forms. For instance, it can include an adjustable electrical delay line responsive to control signals input thereto for establishing the amount of delay of the clock pulses passing therethrough. This adjustable electrical delay line can employ a serial connected network including a coarse time delay adjustment section and a fine time delay adjustment. These coarse and fine delay adjustments each can include an input and an output with the input coupled to a plurality of serially coupled elements each having a finite time delay characteristic. A selector circuit responsive to control signals introduced thereto switches the network for coupling signals from at least one of the adjustment structures to an output. In a multiprocessor environment, the distribution system will preferably include a plurality of clock pulse paths which contain one of the clock pulse delay adjusting arrangements.

The input to the pulse delay adjusting network can receive an electrical signal input thereto but it can also include an optical to electrical signal converter as a second input. Thus it can selectively couple either of the electrical signals to the input of the coarse delay adjustment network.

An alternate embodiment is to utilize optical couplers as at least a portion of the clock pulse transferring paths. In this case, the delay adjusting arrangement can include a selectively variable path length element in the optical path segment. For instance, this can take the form of a source of collimated clock pulse light pulses directed along a first axis into a collimated light pulse receiver also positioned along the path axis. By an appropriate mounting structure, it is possible to selectively vary the displacement between the light pulse source and the receiver along the axis to thus select the desired amount of clock pulse delay.

An advantageous feature of this invention resides in an optical path length varying structure which includes first and second elements coaxially telescoping relative to one another with the first element retaining the source and the second element retaining the light pulse receiver.

In its global sense, the apparatus and methods of this invention is concerned with distributing clock pulses from a master clock pulse generator to modules of processors, input/output controllers and memory units contained within a cluster of a multiprocessor system implemented in accordance with clustered architecture. In such an environment, each module contains a plurality of clock pulse receiver chips. These chips must receive clock pulses for operation of system components controlled by the module in response to arrival of clock pulses at all of the receiving chips within a predetermined maximum time displacement relative to each other.

The master clock pulse output is initially split into a plurality of groups of clock pulse paths. Each such group of paths is connected to a respective cluster module. The paths of each group to the respective clock pulse receiving chips of a given module are connected with a sequence of elements for transferring the clock pulses from the master clock to a respective receiving chip. The paths of each group include delay adjusting structure for controlling the delay of the clock pulses passing therethrough so that the clock pulses all arrive at the receiver chips connected by the group with a time displacement relative to each other no greater than the predetermined maximum time displacement.

As mentioned previously, the delay adjusting structure can include delay circuits responsive to signals introduced thereto for delaying pulse signal passage therethrough in an amount determined by the introduced signal. It is likewise possible to at least partially implement the paths with optical connections. The delay adjustment is then preferably obtained by introducing an optical delay to pulses passing through the optical path. Again, it is possible to obtain this by use of optical delay adjustments that include transmission of light pulses along a collimated optical path into a receiver with the transmitter and receiver movably positioned with respect to one another along the collimated optical path.

The process of this invention results in delivery of clock pulses from a master clock pulse source through a tree of signal paths to a plurality of utilization elements. These elements require the clock pulses to arrive at all the elements within a predetermined maximum time displacement. Initially, the time delay for a clock pulse passing through each of the components employed in forming the signal paths is determined. A listing is compiled of all components serially connected to form each path of the tree followed by totaling of the clock pulse time delays for the components contained in the compiled list for each path. One of the paths is designated as a reference path with respect to its total clock pulse time delay. Selectively variable time delay components are incorporated in the serial connection of all paths which have a clock pulse time delay greater than the predetermined maximum time displacement as compared to the reference path. The variable time delay components are adjusted so that all paths have a clock pulse time displacement no greater than the predetermined maximum time displacement with respect to the reference path.

The reference path designating step can include identification of the path having the longest total clock pulse time delay.

Another feature of this invention is in the network for selectively controlling the time delay of a pulse passing from an input terminal to an output terminal. This can include an initial coarse delay adjustment network having a plurality of delay components with a first of these receiving the clock pulses and the remainder having their inputs and outputs serially coupled from the output of the first delay component. The coarse delay adjusting network responds to a first group of control signals for connecting one of the delay component outputs to an intermediate interface.

The coarse delay network is followed by a fine delay adjustment network having a plurality of second delay components each of which delays the clock pulse by an amount which is a fraction of the clock pulse delay by the coarse network delay components. The intermediate interface is coupled to the second delay networks. The fine delay adjustment network is responsive to a second group of control signals for connecting the output of one of the second delay components to the output terminal. While serial connection of the fine adjustment components is acceptable, it is preferable to couple the intermediate interface in parallel into the inputs of the second delay components.

With regard to the coarse adjustment network, it can include a configuration where the clock pulses are coupled directly to the intermediate interface without delay when selected. This coupling is likewise selectable in response to a set of control signals introduced to the coarse network.

The fine delay networks can each include an input semiconductor, an output semiconductor, and a plurality of semiconductor elements having the collectors thereof connected in parallel for driving the output semiconductor. Selected elements of the bank of semiconductor elements are connected in an emitter follower configuration with the input semiconductor coupled into the base of the selected semiconductor elements. This allows selection of the amount of delay introduced to a pulse passing from the input semiconductor to the output semiconductor as a function of the number of selected semiconductor elements.

Another feature of the present invention resides in the fine adjustment network which introduces a preselected amount of delay to pulses passing from an input terminal to an output terminal. First and second transistors are employed with the first transistor having the base thereof connected to the input terminal and the second transistor having the collector-emitter circuit thereof coupled to the output terminal. A bank of semiconductor elements have their collectors connected in parallel into the emitter-collector circuit of the second transistor. At least one of the semiconductor elements is coupled as a pulse delay stage by including a coupling of that element in an emitter follower configuration with the base thereof connected to the collector circuit of the first transistor. The amount of delay for a pulse travelling through this network between the input and output terminals thereof is a function of the number of the semiconductor elements connected in the pulse delay stage configuration.

It is possible to connect a multiplicity of the aforementioned networks with each network having a different number of the semiconductor elements connected as pulse delay stages. The amount of delay is selectable by further including a switching selector so that the output of one and only one of the networks is coupled to the output terminal.

As is described in detail below, yet another advantageous feature of this invention relates to the controlling of the time delay associated with travel of a light pulses from a source along a collimated light path to a receiver. The transmitter and receiver are selectively positioned relative to one another along the light path for controlling the time delay of light pulses as a function of the displacement therebetween.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
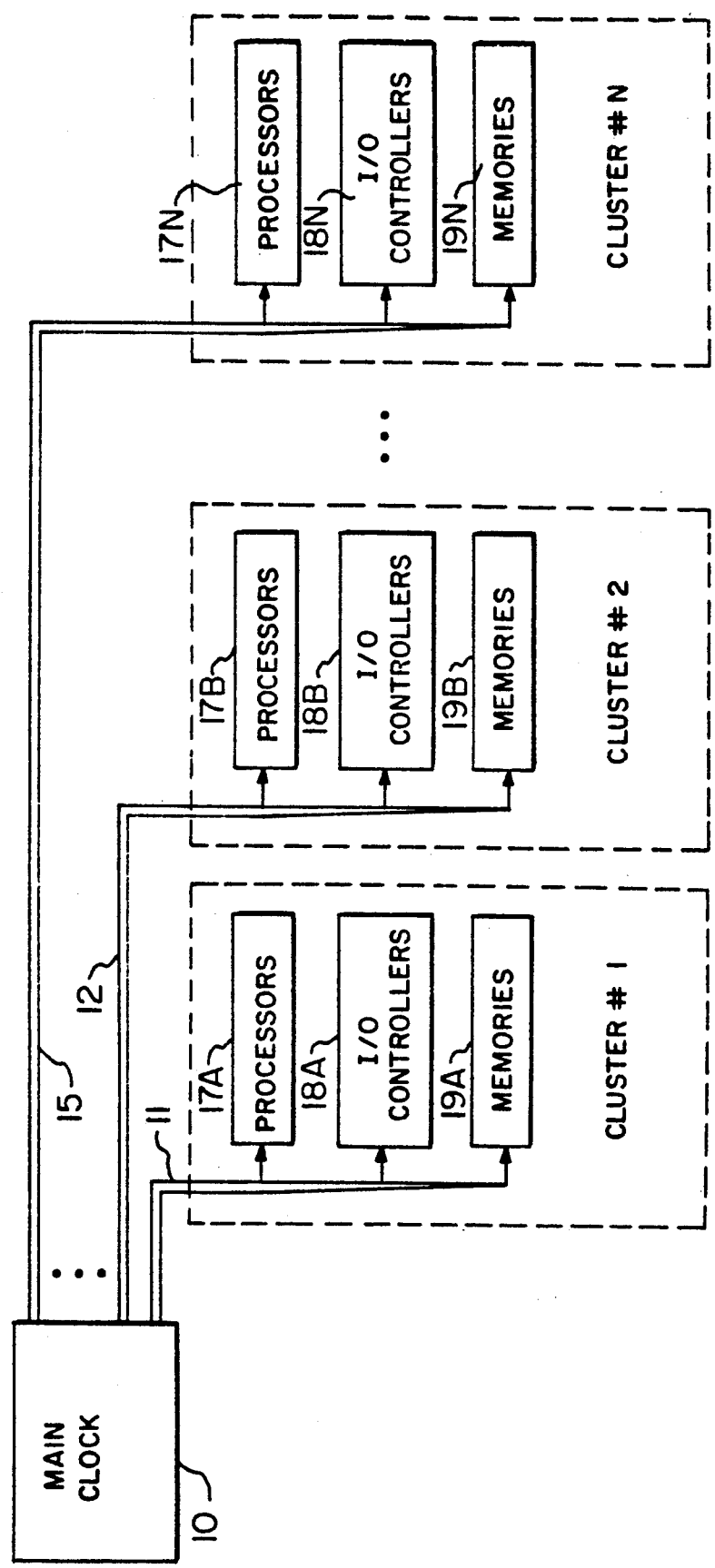
FIG. 1 is an overall block diagram illustrating the general system configuration of a multiprocessor suitable for incorporating the present invention.

A clustered multiprocessor environment is illustrated in FIG. 1 wherein clock pulses from a single master clock 10 are utilized to control functions performed in data handling and processing elements contained within groupings identified as Cluster #1, Cluster #2 through Cluster #N. Pulses from the master oscillator in clock 10 are split and introduced into a plurality of cables shown here as 11, 12 and 15.

Clusters 1-N for FIG. 1 are depicted as generally constructed in accordance with the clustered multiprocessor system along the lines of the teachings in the commonly assigned and copending application Ser. No. 07/459,083 by Chen et al. Thus, in comparison with the aforesaid Chen et al application, the processors 17A-17N would compare to the scalar and vector processor modules, the I/O Controllers 18A-18N to the I/O concentrators, and the memories 19A-19N to the memory units including the Secondary Memory Systems (SMS).

Clustered multiprocessors are preferably operated from a single master clock source so as to commonly lock the operating frequencies and to simplify functional coordination thereof. Furthermore, it is possible to design the processor elements of the multiprocessor for maximum operating speed and throughput if all clock pulses arrive at any given module within a cluster within an extremely tight time tolerance relative to each other. By means of the present invention, coordination of the arrival of clock pulses with a difference in the range of low hundreds of picoseconds or better is obtainable in a system wherein the master clock 10 produces square wave pulses at a hundreds of mHz rate.

Figure 2:
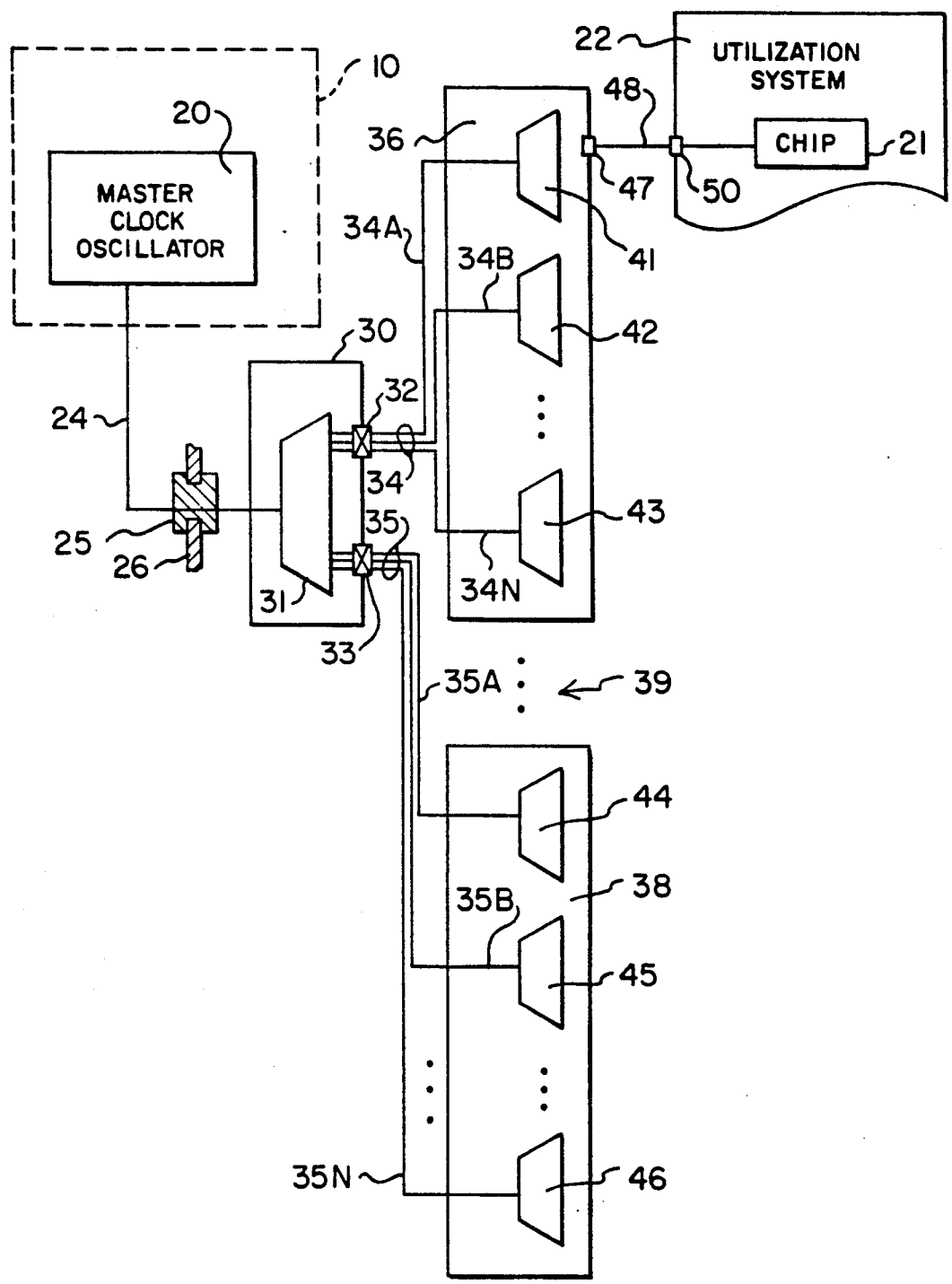
FIG. 2 is a block diagram of an embodiment of a clock pulse distribution system of this invention implemented through the use of electrical components and interconnections.

FIG. 2 shows a typical path from the oscillator 20 of master clock 10 to a discrete chip 21 within a utilization system 22 within one of the modules of a cluster. In this embodiment, all clock signal skew compensation is effected by purely electrical components. In the particular environment shown, the output of oscillator 20 is connected via cable 24 into connector 25 which passes the connection through wall 26 of an enclosure that contains the multiprocessor clusters of modules. While oscillator 20 is generally a relatively stable operating component, it is frequently desirable to surround the operating components with a material which is non-electrically conductive but an efficient thermal conductor. The interior of the enclosure established by the remainder of wall 26 contains this thermally conductive material especially if it is in fluid form.

Cable 24 is ultimately connected to fanout box 30 which, in this case, contains a single fanout chip 31. As here shown, fanout chip 31 splits the input signals on cable 24 into sets of signals through output connectors 32 and 33 which are coupled to output cables 34 and 35. There are conventional chips available for implementation as fanout chip 31 although, if desired, it could also assume a configuration along the lines of the compensated distribution chip described hereinbelow. Further, fanout box 30 could include a multiplicity of chips in a manner similar to fanout boxes 36 and 38 described below so as to produce a plurality of output clock pulse lines like boxes 36 and 38. Under those circumstances, additional fanout boxes would establish the tree branches to fill in the interface suggested by the dots at 39 in FIG. 2.

Fanout boxes 36 and 38 are shown in FIG. 2 as including a parallel connection of their received input clock signals on inputs 34A, 34B and 34N along with 35A, 35B and 35N into their respective clock distribution chips shown generically as 41-46. Each cable provides the necessary signal lines to establish electrical interconnections with connecters for all of the chips in the associated fanout box. Chips 41-46 each preferably include some means of controlling the time delay associated with allowing a given clock pulse to pass therethrough, one unique example of which is described below with regard to FIGS. 3, 4 and 5.

Chip 41 produces an array of output pulses in parallel, one of which is shown herein as output 47 coupled to cable 48. In turn, cable 48 is connected at its remote end to port 50 of utilization system 22 and thence establishes a clock signal input to chip 21.

In an exemplary construction of a multiple cluster system, the processor modules each require a multiplicity of chips such as 41, 42 or 43 each capable of producing a group of binary fanout outputs so that module 36 creates a suitable number of such clock output signals to supply every element of the processor module. These processor module elements demand receipt of clock pulses closely time coordinated with other clock pulses arriving at similar elements in order to obtain optimum processor system performance. It is acceptable to divide the I/O controller cabinets into fractional (eg: half) cabinet clusters that are each clock synchronized by its own distributed clock signal input relative to themselves. In addition, it is acceptable to divide the memory modules into fractional (eg: quarter) cabinet clusters each of which receives clock signal inputs for synchronous coordination of its functions.

Figure 3:
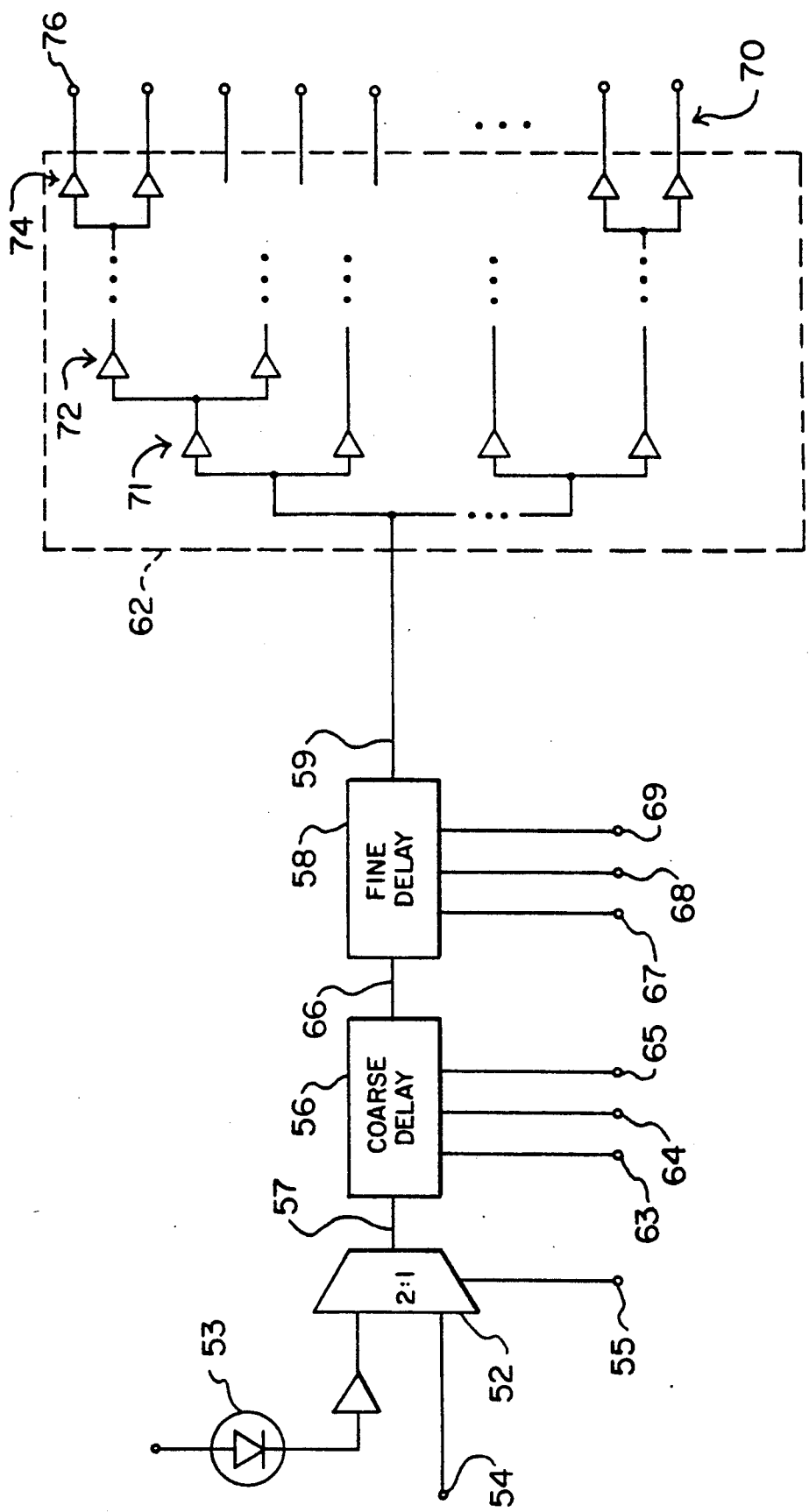
FIG. 3 is a circuit network configured for providing an electrical skew adjustment function.

FIG. 3 is an exemplary fanout chip employing electrical elements for use in conjunction with the present invention. It is shown as capable of selecting either an optical input 53 or an electrical input 54 into two-to-one selector 52 under control of an overall system input signal 55. Either input 53 or input 54 is connected to selector 52 output 57 under control of the selector signal 55. Thus, if only optical or only electrical input signals appear to control the chip, it is possible to omit selector 52 so that connection 57 is directly coupled to the appropriate source of input signals for the FIG. 3 network. Ultimately, the output of coarse delay 56 is coupled to fine delay 58 which in turn energizes input 59 into a distribution tree 62.

The delay of the output 66 from coarse delay 56 is a function of the controlling input signals at terminals 63-65. If, for example, coarse delay 56 is capable of hundreds of picosecond (ps) delays per segment, the binary value of the inputs 63-65 determines the magnitude of the delay from zero to around a nanosecond as is described below. The thus delayed output 66 is introduced to fine delay 58 wherein an additional but smaller overall range of picosecond delay is added in increments as a function of the state of fine delay inputs 67-69. Accordingly, the range of delays possible as a function of the digital values present at inputs 63-65 and is 67-69 is zero to around a nanosecond.

Under usual circumstances, the amount of delay associated with delays 56 and 58 are set at the time of manufacture and "burned in" or otherwise securely established to determine the amount of delay that allows the clock pulses for a particular module to all arrive within the predetermined time tolerance of each other.

Tree distributor 62 receives the final output 59 from fine delay 58 so as to split this clock signal into a multiplicity of clock signals ultimately produced at the output interface 70. These signals are split by an array of integrated circuit fanout elements at the first level 71 followed by subsequent arrays 72, etc, through 74 until the final output signals are all present at interface 70 within the predetermined time tolerance of each other. In an exemplary implementation, interface 70 might include a preselected number of separate clock output signals from the fanout tree 62. Note that output terminal 76 could compare with output terminal 47 for chip 41 in the FIG. 2 description supra.

Figure 4:
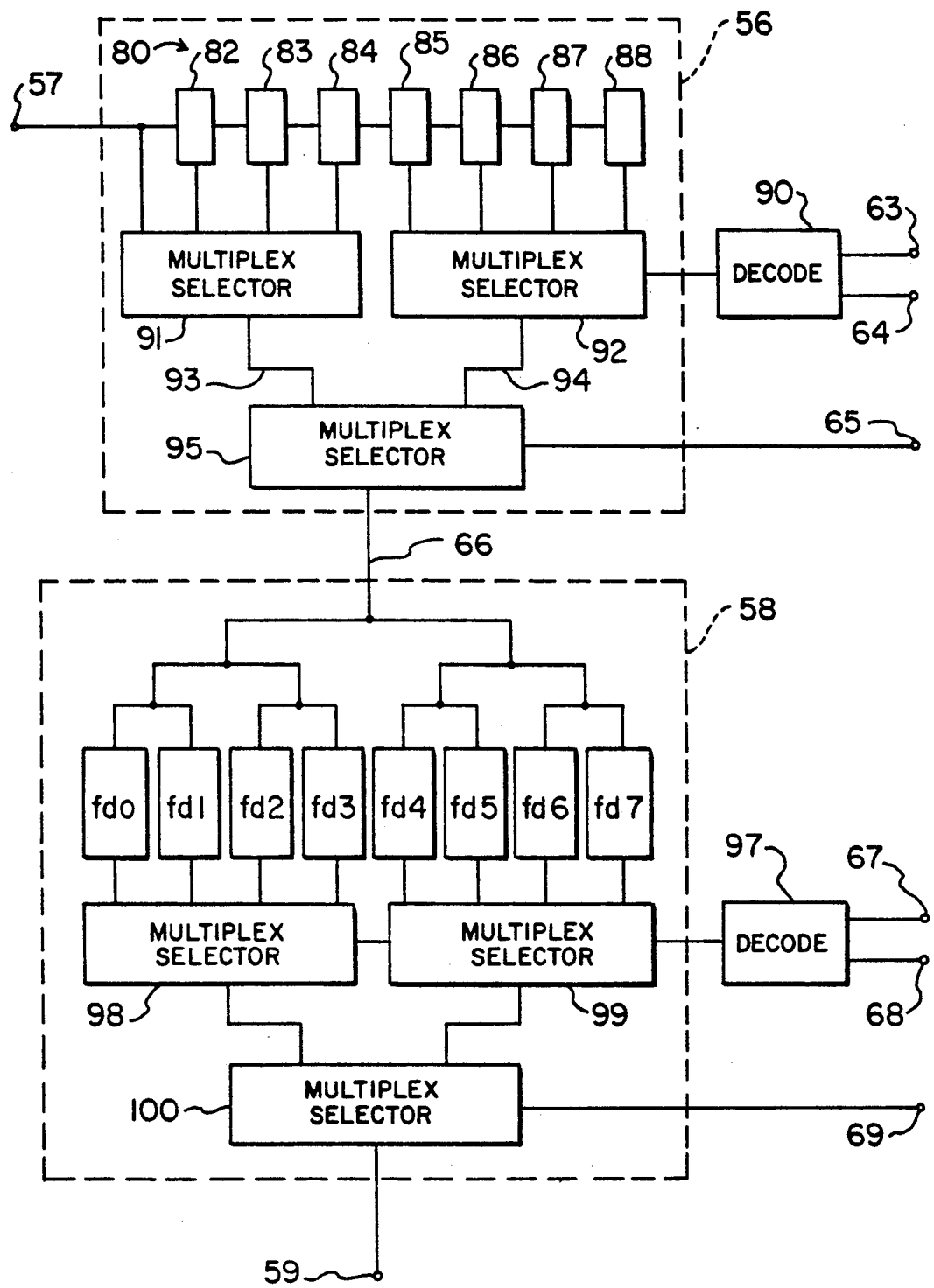
FIG. 4 is a detailed illustration of elements in the FIG. 3 skew adjustment circuit.

FIG. 4 presents one example in greater detail of an implementation of the delay adjustment networks as described above in conjunction with FIG. 3. The reference numerals employed in FIG. 4 correspond directly with the reference numerals of their counterparts in FIG. 3. The coarse adjustment 56 receives input 57 and passes it along serially connected delay element array 80 which includes a direct, undelayed connector 81 and a sequence of delay elements 82-88 coupled thereafter. The binary state of the input selection signals 63 and 64 energize decoder 90 which enables multiplex selectors 91 and 92 to each couple one of its inputs (ie; 81-84 for selector 91 and 85-88 for selector 92) to its respective output 93 and 94. Input 65 then causes multiplex selector 95 to couple either its input 93 or 94 to the connector 66 to provide an input for fine delay 58. Each of elements 82-88 might provide a delay in the range of hundreds of picoseconds thereby creating an overall range of delay for coarse delay network 56 of zero to around a thousand picoseconds more or less between input terminal 57 and output terminal 66. Note that it is not essential to use equal or even linear delay magnitudes for the various segments of either coarse delay 56 or fine delay 58 depending upon the intended use of these networks.

Signal line 66 is introduced to fine delay 58 and is split to provide parallel inputs to eight circuit networks identified as fd0 through fd7. These networks are identical in basic structure but differ in selected elements so as to have progressively greater delay magnitude. That is, fd0 might have zero delay, fd1 a delay in the range of tens of picoseconds, fd2 an additional delay in the tens of picoseconds range, and so forth. In a manner somewhat similar to operation of the previously described coarse delay network 56, the binary combination of signals on input terminals 67 and 68 cause multiplex selectors 98 and 99 to each couple one of its inputs into multiplex selector 100. The final input 69 determines which of the two inputs to multiplex selector 100 is actually delivered to output 59.

Figure 5:
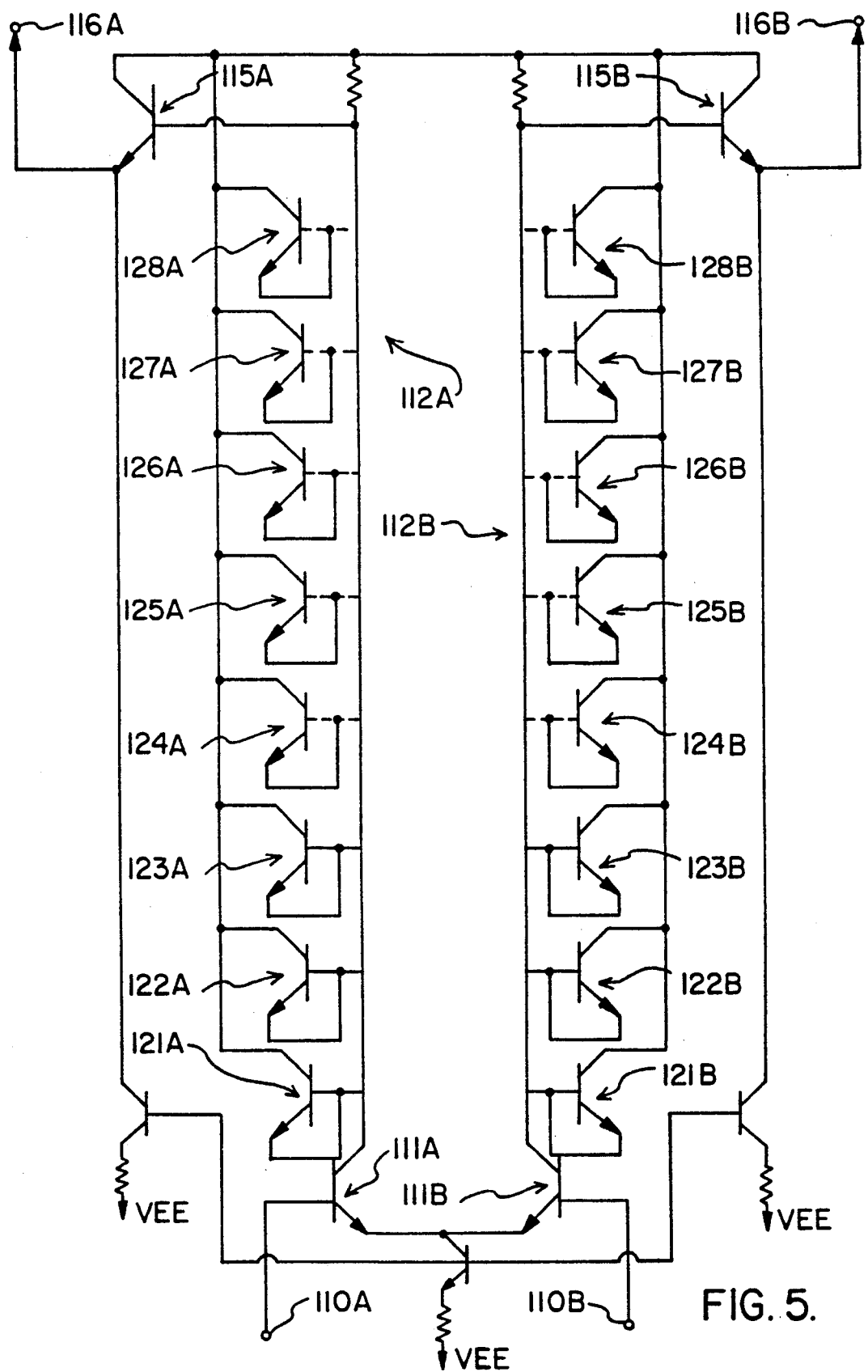
FIG. 5 is a diagram of a network of semiconductor elements for user selection of a particular fine delay for use in a network such as in FIGS. 3 and 4.

FIG. 5 shows a basic semiconductor network suitable for any of elements fd0-fd7 although customized to function as delay fd2. It accepts signals from the coarse delay output at input terminals 110A and 110B which are coupled to the base circuits of semiconductors 111A and 111B, respectively. The collectors of semiconductors 111 are connected in parallel to drive the base circuits of respective banks of semiconductor elements 112A and 112B. These semiconductor banks are coupled into the base circuit of output semiconductor stages 115A and 115B which appropriately energize the complementary output terminals 116A and 116B.

Semiconductor banks 112 are each composed of a multiplicity of parallel connected semiconductor stages 121-128. The amount of delay is determined by application of tabs to complete the selected semiconductor stages. If minimal delay is desired, then only tabs to complete the base circuits of 121A and 121B are included. However, to establish the fd2 delay, tabs are applied which complete the base circuits of semiconductors 121, 122 and 123 whereas base tabs are omitted for elements 124-128 as is shown in FIG. 5.

The impedance of the base circuits for output semiconductors 115A and 115B is thus controlled thereby controlling the amount of time delay for signals to pass from inputs 110 to outputs 116. Even though inactive semiconductor elements remain in the network after the desired delay is selected, it is preferable to allow those inactive elements (eg: 124-128) to remain physically in the network so that the stray capacitance stays constant for all the fd0-fd8 networks.

Once it is determined the amount of overall delay desired for the configuration shown in FIG. 4, this delay is locked in the selector input signals 63-65 and 67-69 so that the appropriate signal levels become fixed into the arrays of multiplex selectors shown. One way of producing this result is to burn out fuse elements in selected input lines from terminals 63-65 and 67-69 so that only one path is selected between input 57 and output 59 when a fixed bias to terminals 63-65 and 67-69 is in use. Inputs 63-65 and 67-69 might typically default to a logic "1" and fuse to a logic "0".

As mentioned, it is highly desirable in a clustered multiprocessor environment to control the skew amongst clock pulses arriving at a large number of distribution points to as tight a tolerance as possible. While the FIG. 2 distribution system shows only one destination chip 21, the number of such target destinations for clock pulses needed to functionally control one cluster typically runs into the hundreds if not the thousands. It is difficult if not impossible to employ a single measuring device to sense the arrival of clock pulses at such a large number of destination points and accurately measure the time skew therebewteen. Thus one feature of the present invention is to determine the total time skew of each discrete distribution path. Thereafter a skew time budget is established for each path with its delay selected and adjusted so that the clock pulses arrive at the target points within the predetermined tolerance.

More particularly, any time delay of the clock pulses from master oscillator 20 to the input of fanout chip 31 is irrelevant and ignored. However, reasonably accurate measurement of the time skew of each output of chip 31 relative to its input is possible. That data thus becomes available to create a log thereof. The length of the output lines and the delay caused thereby is also measured and logged while the delay across particular circuit elements such as connectors 32 and 33 is measured and likewise logged. The lengths of each connector to its downstream fanout chip such as 41 is next determined and logged for that path. The same is done for the connectors 47 and 50 as well as interconnecting lines such as 48. Ultimately the total delays for each definable clock pulse path are computed and the amount of delay needed in each such path to bring the total delay to within the desired skew tolerance is computed. Delay elements are introduced to the paths as necessary as by burning in appropriate fuse combinations in the coarse delay and applying base selector tabs to the fine delay elements as described above.

The process of skew compensation in an electrical embodiment as shown in FIG. 2 is further enhanced by measuring the delay associated with common fixed components such as cables of particular lengths, connectors of various types, etc. Consistent care in quality control during fabrication of those components may simplify the quantity of measurements demanded in establishing the delay budget for any given path. It is also helpful to avoid use of components that exhibit varying delay characteristics in operation and to only employ circuit elements including cables and connectors that have relatively stable and predictable time skew operating characteristics in the normal machine environment.

It is likewise preferable to avoid skew from unbalanced switching and skew from unbalanced loading. These factors require careful attention to balancing circuit designs and point to point net lengths as well as total capacitance. Wide resistors with all transistors and resistors oriented in the same manner and circuit operation at optimum current density will aid in avoiding skew from chip process variations. Skew from chip to chip process variations is minimized by incorporating the above described tuning scheme. Other techniques to reduce skew effects include use of supply voltages from voltage compensated bandgap regulators which provide a constant reference.

Figure 6:
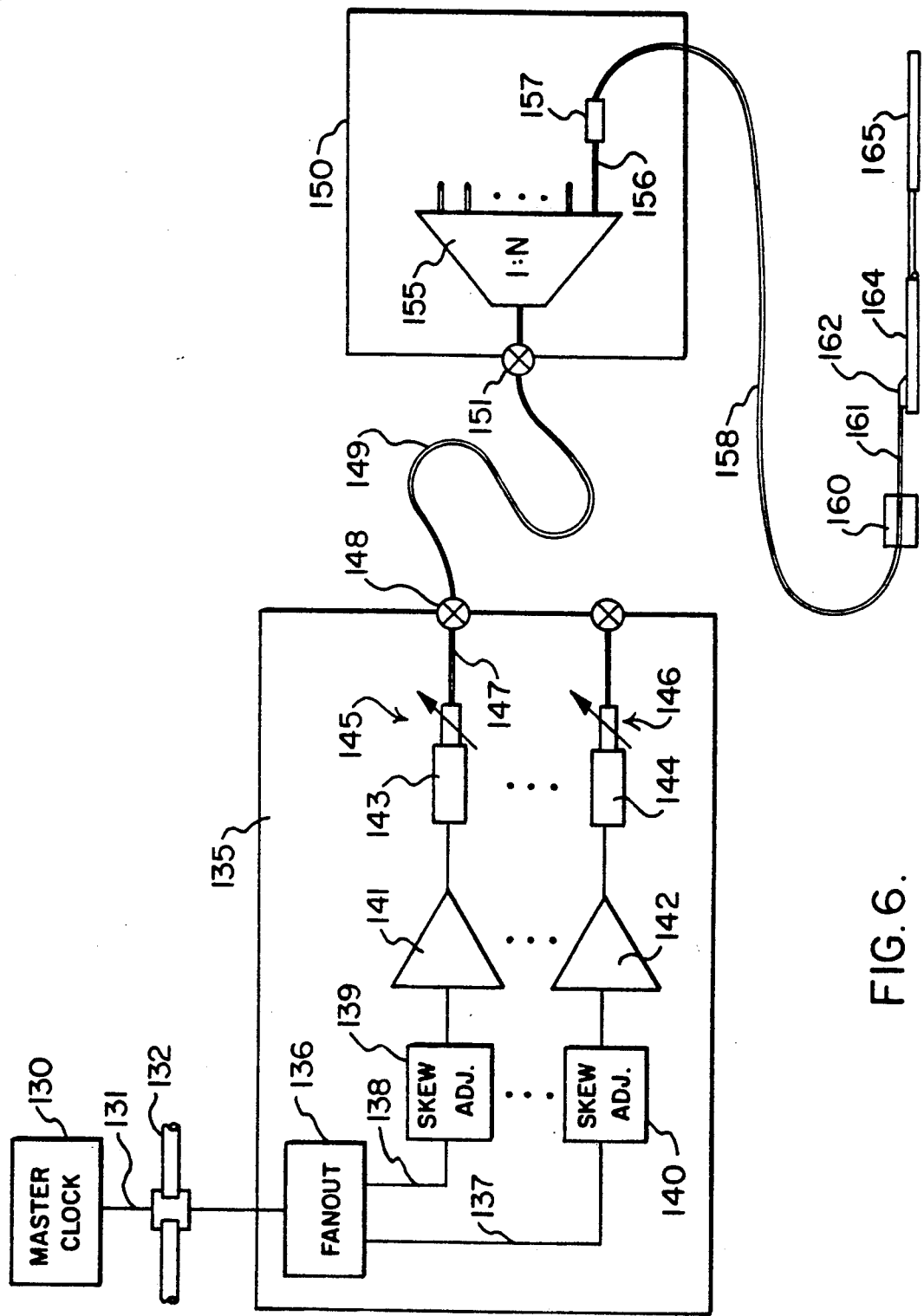
FIG. 6 is a block diagram of an embodiment of this invention using optically coupled components for implementing skew adjustment for aligning distributed clock pulses.

FIG. 6 illustrates an embodiment of a clock pulse distribution system incorporating optical components for various clock pulse paths. As with the FIG. 2 embodiment, the FIG. 6 configuration is especially well suited for implementation within a multiprocessor environment along the lines of that disclosed in the cross-referenced Chen et al application. This system likewise has a master clock 130 for synchronizing a variety of system functions such as the clusters mentioned previously.

Output 131 is coupled through a bulkhead 132 or the like which isolates the system clusters from the atmosphere to contain an appropriate heat transfer material. In contrast to FIG. 2, the conductors of clock cable 131 in FIG. 6 are introduced to a laser fanout box 135. An initial fanout chip 136 splits the clock signals from cable 131 into a plurality of connectors such as 137 and 138. The clock pulses are then passed through coarse skew adjustment networks 139 and 140. Coarse skew adjustment networks similar to those described above are suitable for networks 139 and 140 with an incrementally selectable range of from zero to a relatively small number of nanoseconds, for example. Commercially available programmable delay line integrated circuits can also serve for elements 139 and 140.

Contemporary laser driver circuits 141 and 142 actuate lasers 143 and 144 to introduce pulses of light corresponding to the clock pulses into optical coupler and skew adjustment assemblies 145 and 146. Preferably lasers 143 and 144 are semiconductor laser diodes. There are several standard optical disk lasers (ie: higher powered than compact disc lasers) which are suitable for purposes of use in this invention. As is described below, assemblies 145 and 146 each collimate and focus the light from their respective laser sources 143 and 144 for transmission through optical fibers to a particular cluster. In FIG. 6, only one example of a system distribution path is shown stemming from the output fiber 147 of skew adjuster 145 to a final target destination chip as is described below. However, the system includes a veritable plethora of such paths as is readily evident from FIG. 6.

Clock light pulses pass through fiber 147, optical connector output port 148 and distribution fiber 149 into optical splitter box 150 via connector 151 to provide an input to 1:N optical splitter 155. Several different arrangements exist which can accomplish the optical path splitting function of splitter 155. Corning Inc offers an optical splitter capable of a split which is adequate for this function. The clustered multiprocessor environment generally only demands that splitter 155 typically establish a split with low excess loss and good output uniformity. It should operate as a multimode waveguide with a graded index and non-mode selective functioning.

There are a variety of other splitter techniques and devices, however. For instance, use of discrete optic elements such as combinations of beam splitters and lenses can perform with low excess loss although they tend towards large sizes and demand critical alignment. Fused fibers (eg: twisted, heated and drawn) also exhibit low excess loss with integral pigtails and both single mode and multimode functioning. However, they are mode selective in that they are dependent on high order mode coupling while output power balancing is dependent on input power distribution. Lapped fibers which are ground to their cores and placed together enjoy the same advantages and disadvantages as fused fibers.

Special optical glass material well suited for use in ion exchange glass waveguides can prove useful for this invention for a number of reasons. They have a low excess loss (0.01 dB/cm), exhibit uniform power splitting, are not mode selective, are suitable for integration, and are amenable to photolithographic mass production. They are a true GRIN waveguide where GRIN means graded index. In step index optical fibers, direct coaxial light will tend to arrive at the end ahead of light which has bounced from the sidewalls thereby causing distortion and jitter. GRIN cable is constructed so that the coaxial light is slowed somewhat while the bounce paths are accelerated so that all light of a given pulse arrives at the end coincidentally. Its excess loss is primarily due to pigtail alignment. While singlemode waveguides appear possible, they are not yet widely available.

A polymer waveguide might enjoy some of the integration and mass production advantages of ion exchange glass waveguide optical glass material especially as a primarily singlemode waveguide. There are questions as to whether it can function as a GRIN multimode waveguide, its loss levels and its mode selective evanescence.

Fiber 156 is a typical output from splitter 155 and is fusion spliced at junction 157 to an optical fiber 158. Fiber 158 and a plurality of similar optic cables are each routed to an assembly of chips where they are coupled to a target chip. Connector 160 on the chip assembly frame receives fiber 158 and connects it to fiber 161 which terminates in a coupler block 162. As described below, coupler block 162 directs the light pulses into photodetecting clock receiver chip 162 which converts the optic pulse into an electrical pulse for introduction to logic chip 165.

Fusion splicing devices and techniques for connectors such as 157 are available. For this technique, essentially two fibers are joined directly by abutting cleanly cleaved ends and heating the ends to fusion temperature. The result is a low loss connection.

Figure 7:
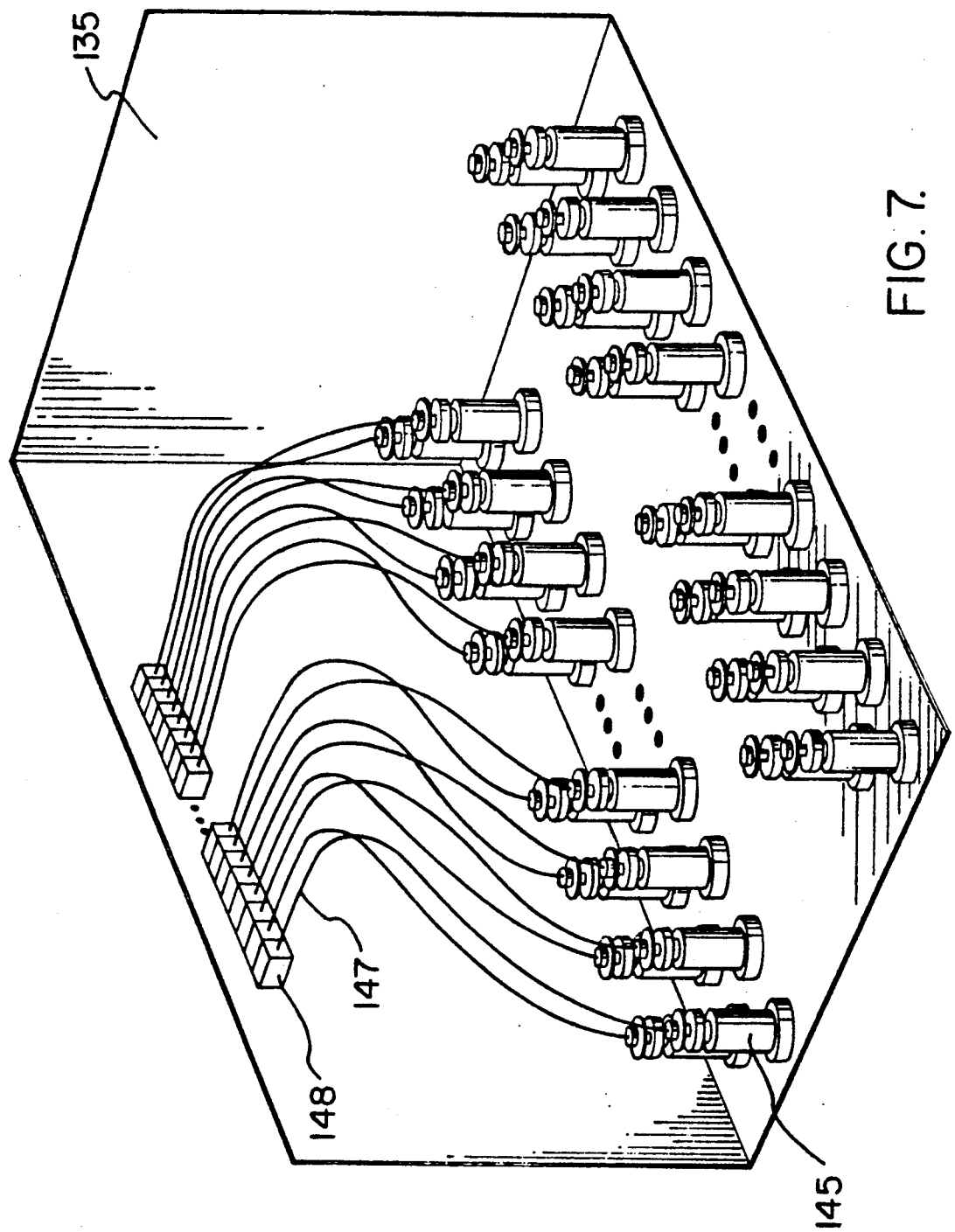
FIG. 7 is an isometric view of the interior of an array of optical skew adjusting elements for the FIG. 6 embodiment.

FIG. 7 shows the array of optical skew adjusting mechanisms contained within a typical laser fanout box 135 of FIG. 6. The pulses from the clock source 130 are passed through the intervening elements shown in FIG. 6. Ultimately lasers in the base of each assembly such as laser 143 (FIG. 6) in the base of assembly 145 are actuated to direct a light pulse coaxially therethrough into an output fiber 147 and an optical output port 148 for further distribution to the optical splitter box 150.

Figure 8:
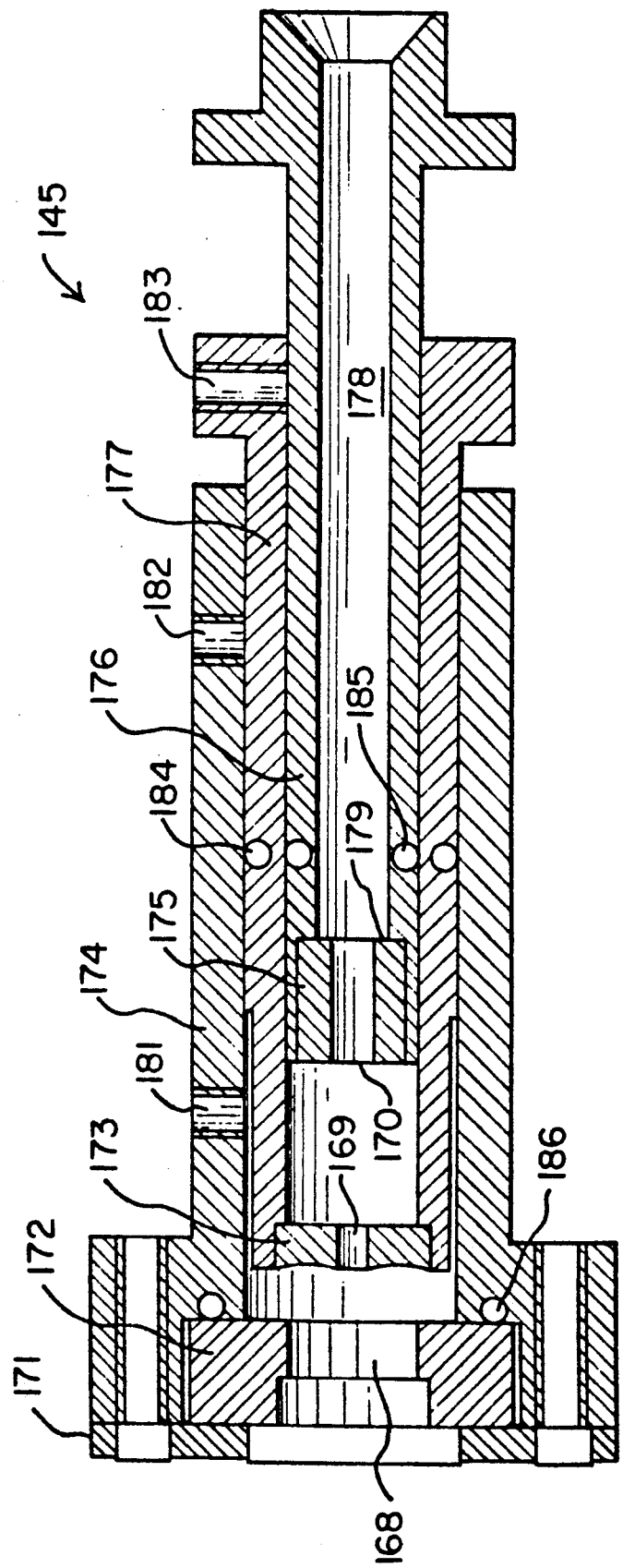
FIG. 8 is a side, section view of an optical skew adjusting element.

The skew adjusters arrayed in FIG. 7 preferably are configured in the particularly advantageous telescoping structure shown in the side section view in FIG. 8. This device is configured so that it is relatively easy to manipulate whereby optical skew adjustment is obtained with a high degree of accuracy but with minimum distortion. The laser diode (not shown) is physically mounted within cavity 168 defined by mounting collar 172. Retaining plate 171 holds the laser and mounting collar 172 in place. A collimating lens positioned within cavity 169 is held in place by lens collar 173. Collimated light from the lens in 169 is directed into a self focussing (selfoc) lens in cavity 170 of collar 175. Main body 174 retains concentric sleeves 176 and 177 so as to accommodate coaxial sliding movement relative to each other.

A commercially available selfoc lens assembly fits snugly within the central bore 178 of skew adjusting sleeve 176. That is, the lens itself fits within cavity 170 while the holder securing the lens fits snugly within the interior of bore 178 with its shoulder engaging rear shoulder 179 of lens holder 175. These selfoc assemblies include a barrel that extends into bore 178 and an output fiber of considerably smaller diameter than bore 178.

When the laser is in place in cavity 168, the collimating lens is in cavity 169 and the receiving selfoc lens is in 170, sleeve 177 is coaxially positioned to optimize the light beam coupling from the laser into the collimating lens. A set screw is then tightened into threaded hole 182 so as to fix the spacing between the laser and collimating lens (ie: the spacing between cavities 168 and 169). Port 181 allows atmospheric communication for the chamber defined by the inner walls of collars 172 and 173. Note that, although not shown, porting is likewise included into the chamber defined between collar 173 and the selfoc lens holder 175.

Note further that the FIG. 8 apparatus can employ a selfoc lens coupled by an optical fiber as the light transmitter source secured in chamber 168 with the light originating from a laser at a remote location but with its light coupled into the input fiber for that selfoc lens. Under those circumstances, a separate collimating lens in cavity 169 is not required and it is even possible to place the selfoc lens directly in cavity 169 of collar 173 if desired. This could further simplify the structure and structural relationships associated with implementing a FIG. 8 apparatus.

After the delay needed to coordinate clock pulse arrival for the path which includes skew adjuster 145 at the utilizing clusters is determined, sleeve 176 is moved coaxially with respect to the interior of sleeve 177 to select an appropriate physical increment for inclusion in the associated light path. At that point, a set screw is secured in threaded hole 183 to fix sleeves 176 and 177 to one another as well as in regard to body 174. The interior is otherwise sealed by 0-rings 184, 185 and 186.

A device along the lines of the FIG. 8 structure to handle clock pulses at the hundreds of mHz range was constructed with coaxial travel of about one inch for sleeve 177 relative to body 174 and coaxial travel of slightly over 1.2 inches for sleeve 176 relative to sleeve 177. A delay range of about zero to one hundred ps at under 4 dB loss was obtained. Note that a somewhat similar result is possible in an arrangement wherein two selfoc lenses are linearly arrayed so that light produced by one is directed into the other. By maintaining a coaxial alignment of the two lenses, adjustment of the delay is obtained by physically moving one or both of the selfoc lenses toward or away from one another.

Figure 9:
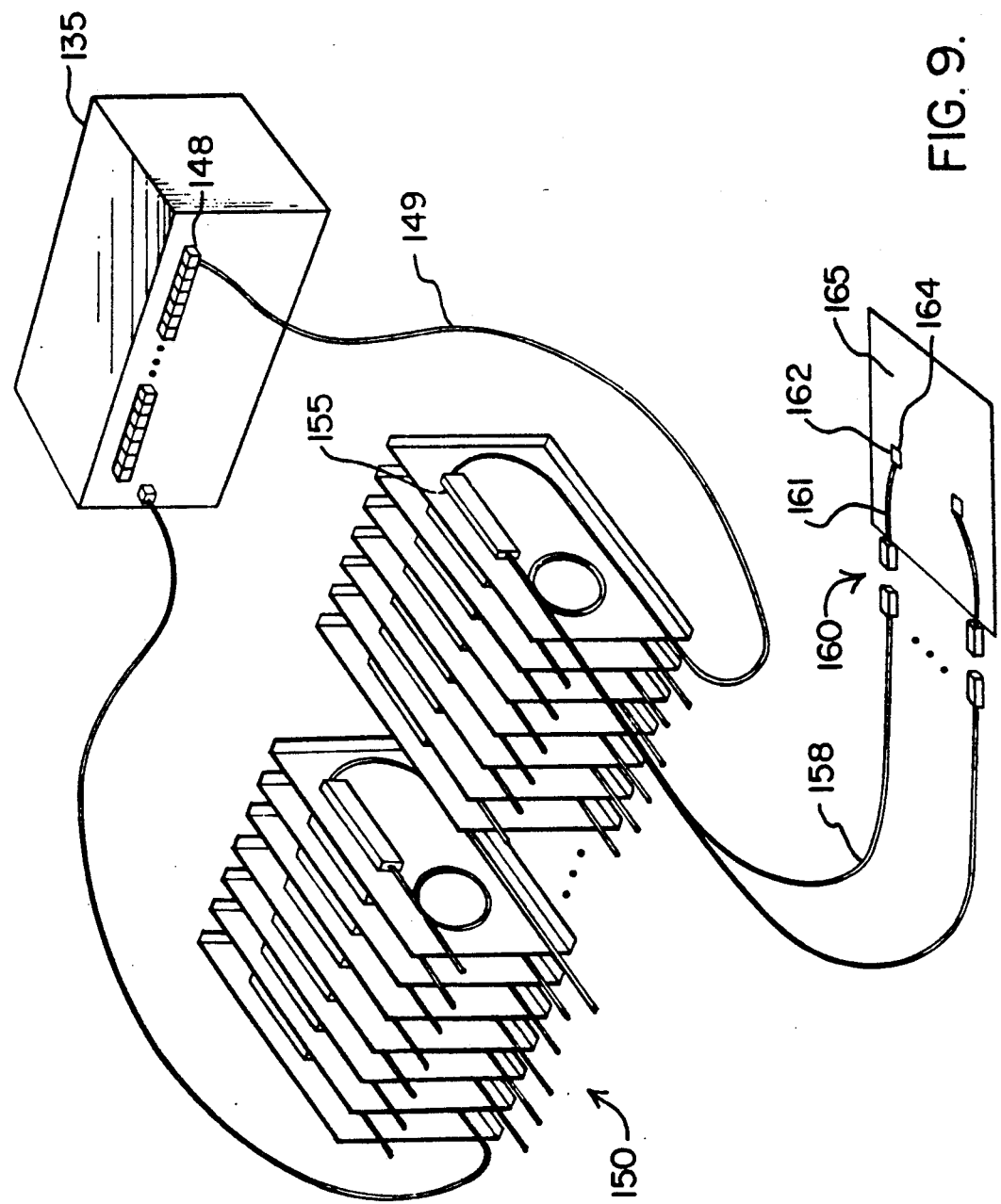
FIG. 9 is diagram of typical interface connections of an optical splitter box between the laser fanout box and the logic chips.

The optical output paths for the laser fanout box 135 is depicted in FIG. 9. As mentioned above, fiber cable 149 is connected to output port 148 and thence to optical splitter box 150. Cable 149 is connected to ultimately provide the input to optical 1:N splitter element 155. One output 156 of splitter 155 is fusion spliced (not shown in FIG. 9) to fiber cable 158 which connects to chip module assembly connector 160. Fiber 161 completes the optical path to connector block 162 for introducing clock pulses to clock receiver chip 164 to enable logic chip 165.

Figure 10:
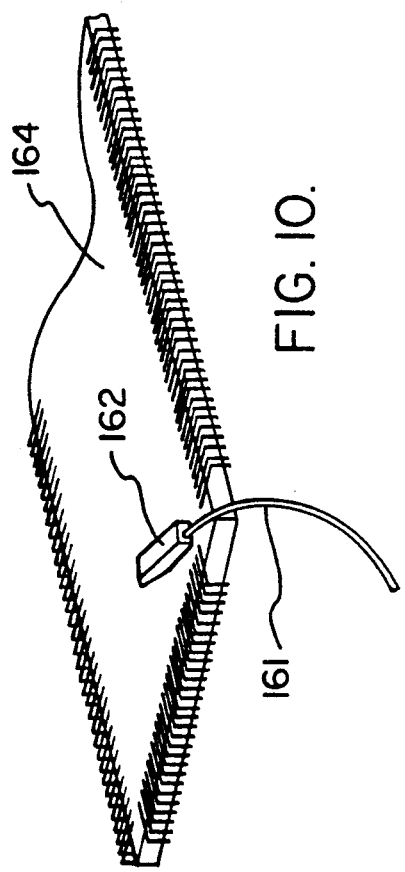
FIG. 10 is a more detailed view of an optical connector positioned over an integrated circuit.

FIG. 10 shows the physical interfacing of connector block 162 for optical fiber 161 with respect to the clock receiver chip 164. Block 162 is physically moved about on the surface of chip 164 until it is determined that the maximum optical coupling into the photodetector of chip 164 is attained. Contemporary measurement devices are available for this purpose. Block 164 is then fixed in place such as by curing an ultraviolet sensitive epoxy surrounding block 162.

Figure 11:
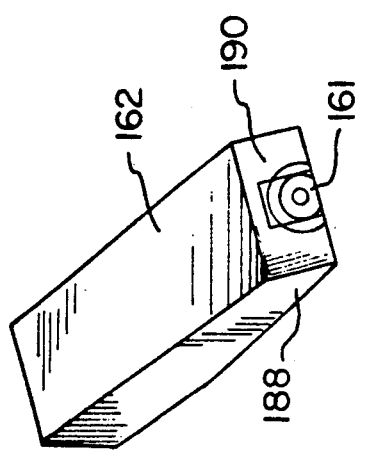
FIG. 11 is an expanded view of the optical connector in FIG. 10.
Figure 12:
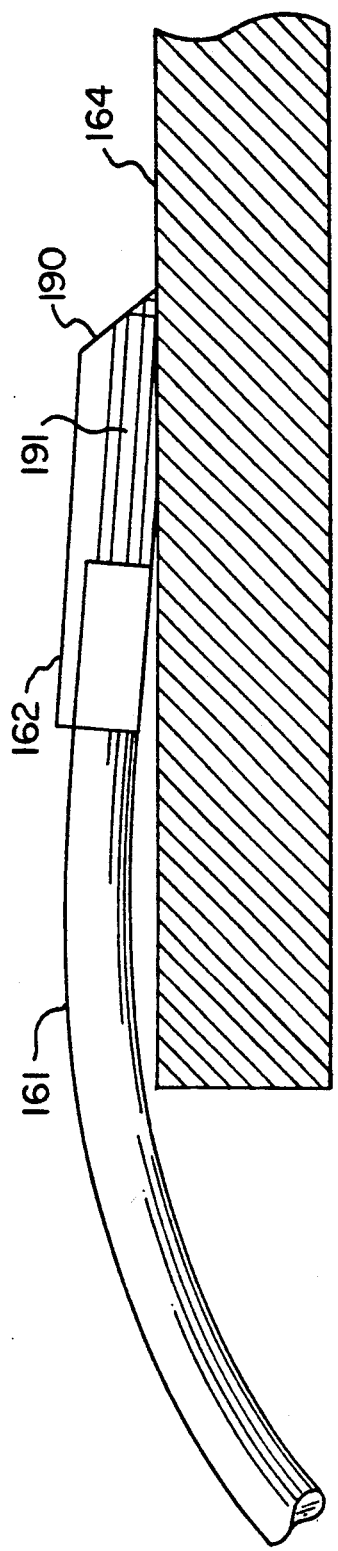
FIG. 12 is a side section view of the optical bevel block connector for cooperating with the FIG. 10 optical receiver chip.

FIG. 11 is an isometric view of coupler block 162 and FIG. 12 is a side sectioned view showing its actual optical interface relation with a photodetector surface of clock receiver chip 164. Fiber 161 passes through a block of encasing material which is then ground to create a narrowly sloping surface. The grinding is performed into the interior of fiber 161 so that an elongated flat surface of fiber 161 is established in downward facing relationship as is evident in FIG. 12. A bevelled end face 190 is formed on block 162 with light reflecting material applied or deposited on surface 190. Thus a light beam 191 shown entering end block 162 will encounter the reflective surface 190 which diverts it downwardly as shown into the photosensitive surface of clock receiver chip 164.

The process for coordinating clock pulse distribution for the embodiment described with respect to FIGS. 6–12 is similar to the all electrical system described for FIG. 2. From the point that clock pulses are split in fanout chip 136 to the final pulse delivery at a receiver chip 164, the delay caused by each and every element, lead and connection making up a given serial path is measured and logged. The delay budget associated with each such path is determined and the skew adjustment circuits and elements are set in appropriate paths so that all clock pulses of a given cluster module arrive within the predetermined time skew tolerance. In FIG. 6, this is accomplished by a coarse adjustment in networks 139 and 140 and a fine adjustment in optical skew adjusters 145 and 146.

As those having normal skill in the art will readily recognize, integrity of the clock pulses is enhanced by the inclusion of amplification stages associated with various circuit elements described above in conjunction with the balanced design of the networks as finally implemented. Careful tuning of the various delay elements as described above and selection of components having pre-measured signal delay characteristics is also potentially helpful. Those having normal skill will also recognize that implementation of the present invention using exclusively optical paths from master clock to utilization chip is possible. However, taking the present state of the commercially available optical art into consideration, it is probably necessary to include at least some intervening electrical conversion and coupling devices into the design of such systems even where the system design is predominantly optical in nature.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for distributing clock pulses from a master clock pulse generator to a system having at least one module which must receive a multiplicity of clock pulses at a multiplicity of clock pulse receiving points for operation of system components in response to arrival of clock pulses at the receiving points within a predetermined maximum time displacement relative to each other comprising:

a plurality of path establishing means each connected to receive clock pulses from the master clock and having an output connection to a respective clock pulse receiving point, each said path establishing means including elements connected for transferring the clock pulses from the master clock to said respective receiving point, and means in at least one of said path establishing means for adjusting the delay of the clock pulses passing therethrough so that the said passing clock pulse arrives at the said output connection of the associated said path establishing means with a time displacement equal to or less than the predetermined maximum time displacement, said adjusting means including an adjustable electrical delay line responsive to control signals input thereto for establishing the amount of delay of the clock pulses passing therethrough, said adjustable electrical delay line including a serial connected network having means for providing a coarse time delay adjustment and means for providing a fine time delay adjustment, said course and fine delay adjustment means each including an input and an output with said input coupled to a plurality of serially coupled elements each having a finite time delay characteristic and a selector circuit responsive to said control signals introduced thereto for coupling signals from at least one of said adjustment means to said adjustment means output, said coarse and fine delay adjustment means each including an input and an output with said input coupled to a plurality of serially coupled elements each having a finite time delay characteristic and a selector circuit responsive to said control signals introduced thereto for coupling signals from at least one of said adjustment means to said adjustment means output, each said plurality of serially coupled elements being configured in a network including first and second transistor means with said first transistor means having the base thereof connected to said input and said second transistor means having the emitter-collector circuit thereof coupled to said output, a bank of semiconductor elements having their collectors connected in parallel into said emitter-collector circuit of said second transistor, and at least one of said semiconductor elements being coupled as a pulse delay stage by including means coupling said element in an emitter follower configuration with the base thereof connected to the collector circuit of said first transistor means, whereby the amount of delay for a pulse travelling through said network between said input and output thereof is a function of the number of said semiconductor elements connected in said pulse delay stage configuration.

2. Apparatus in accordance with claim 1 wherein a plurality of said path establishing means include said clock pulse delay adjusting means.

3. Apparatus in accordance with claim 2 wherein the input to said adjusting means includes means for receiving an electrical signal input thereto and means for converting optical input signals introduced thereto to a second electrical signal, and means for selectively coupling one of said electrical signals to said coarse delay adjustment means input.

4. Apparatus in accordance with claim 1 wherein said optical path length varying means includes a source means for producing collimated clock pulse light pulses along a first axis, means for receiving said collimated light pulses along said first axis, and means for mounting said light pulse source means and receiving means for selectively varying the displacement therebetween along said first axis.

5. Apparatus in accordance with claim 4 wherein said optical path length varying means includes first and second elements coaxially telescoping relative to one another with said first element retaining said source and said second element retaining said receiving means.

6. Apparatus in accordance with claim 1 wherein said adjusting means includes an electrical signal delay means, said optical coupling means includes means for interfacing said optical coupling means with said electrical signal delay means, and means serially connecting said electrical delay means and said optical coupling means for passing clock pulses therethrough with a delay that is cumulative from said electrical delay means and said optical coupling means.

7. Apparatus in accordance with claim 6 wherein said electrical delay means is responsive to control signals input thereto for establishing the amount of delay of the clock pulses passing therethrough whereby said electrical delay means provides a coarse clock signal delay of a selectable magnitude whereas said optical coupling means provides a selectable amount of fine clock pulse signal delay.

8. Apparatus for selectively controlling the time delay of a pulse passing from an input terminal to an output terminal comprising a coarse delay adjustment network having a plurality of delay means with a first of said delay means receiving the clock pulses and the remainder having their inputs and outputs serially coupled form said output of said first delay means, said coarse delay adjusting network further including means responsive to a first group of control signals for connecting one of said delay means outputs to an intermediate interface, a fine delay adjustment network having a plurality of second delay means each of which delays said clock pulse by an amount which is a fraction of the clock pulse delay by said coarse network delay means, said second delay means each including an input semiconductor, an output semiconductor, and a plurality of semiconductor elements having the collectors thereof connected in parallel for driving said output semiconductor, means connecting selected ones of said plurality of semiconductor elements in emitter follower configurations with said input semiconductor coupled into the base of said selected semiconductor elements, so that the amount of delay introduced to a pulse passing from said input semiconductor to said output semiconductor is a function of the number of selected semiconductor elements, and means coupling said intermediate interface to said second delay means, said fine delay adjustment network including means responsive to a second group of control signals for connecting the output of one of said second delay means to said output terminal.

9. Apparatus in accordance with claim 8 wherein said intermediate interface is coupled in parallel into the inputs of said second delay means.

10. Apparatus in accordance with claim 8 wherein said coarse adjustment network further includes means for coupling clock pulses to said intermediate interface without delay when selected by said coarse means control signal responsive means.

11. A network for introducing a preselected amount of delay to pulses passing from an input terminal to an output terminal comprising first and second transistor means with said first transistor means having the base thereof connected to the input terminal and said second transistor means having the collector-emitter circuit thereof coupled to the output terminal, a bank of semiconductor elements having their collectors connected in parallel into said emitter-collector circuit of said second transistor, and at least one of said semiconductor elements being coupled as a pulse delay stage by including means coupling said element in an emitter follower configuration with the base thereof connected to the collector circuit of said first transistor means so that the amount of delay for a pulse travelling through said network between said input and output terminals thereof is a function of the number of said semiconductor elements connected in said pulse delay stage configuration.

12. Apparatus in accordance with claim 11 which includes a multiplicity of said networks with each said network having a different number of said semiconductor elements connected as said pulse delay stages, said apparatus further including means for selecting the output of one of said networks for coupling to the output terminal.

13. Apparatus in accordance with claim 12 wherein said networks are connected in parallel to the input terminal.

* * * * *

UNITED STATES PATENT AND TRADEMARK OFFICE
CERTIFICATE OF CORRECTION

PATENT NO. : 5,293,626
DATED : March 8, 1994
INVENTOR(S) : Edward C. Priest et al.

It is certified that error appears in the above-indentified patent and that said Letters Patent is hereby corrected as shown below:

On the title page, item [54] and column 1, line 2, after "PROCESSES", insert --USING ELECTRICAL AND OPTICAL DELAY LINES--.

Title page, right-hand column, in the *Attorney, Agent, or Firm* section, delete "Merchant, Gould, Smith, Edell, Welter & Schmidt" and insert therefor --Schwegman, Lundberg & Woessner--.

Signed and Sealed this

Twenty-first Day of January, 1997

Attest:

BRUCE LEHMAN

*Attesting Officer*     *Commissioner of Patents and Trademarks*